United States Patent [19]

Ultee

[11] Patent Number: 4,973,618

[45] Date of Patent: Nov. 27, 1990

[54] OLIGOMERIC SEMICARBAZIDE ADDITIVES FOR SPANDEX

[75] Inventor: Arnoldus J. Ultee, Waynesboro, Va.

[73] Assignee: E. I. Du Pont de Nemours & Company, Wilmington, Del.

[21] Appl. No.: 414,409

[22] Filed: Sep. 29, 1989

[51] Int. Cl.$^5$ .................... C08K 5/26; C07C 133/02
[52] U.S. Cl. ................... 524/192; 524/191; 564/34; 564/35; 564/37
[58] Field of Search .............. 524/191, 192; 564/34, 564/35, 37; 528/61, 64

[56] References Cited

U.S. PATENT DOCUMENTS

| | | | |
|---|---|---|---|
| 2,969,386 | 1/1961 | McElroy | 260/471 |
| 3,149,998 | 9/1967 | Thurmaier | 524/192 |
| 3,377,308 | 4/1968 | Oertel et al. | 564/34 |
| 3,399,167 | 8/1968 | Rosendahl et al. | 524/192 |
| 3,415,790 | 12/1968 | Davis et al. | 528/61 |
| 3,461,106 | 8/1969 | Oertel et al. | 528/61 |
| 3,642,703 | 2/1972 | Suzuki et al. | 528/61 |
| 3,658,746 | 4/1972 | Rosendahl et al. | 260/30.8 |
| 3,726,836 | 4/1973 | Nakahara et al. | 260/75 |
| 4,499,221 | 2/1985 | Saitoh et al. | 524/109 |
| 4,666,966 | 5/1987 | Fujimoto et al. | 524/114 |

FOREIGN PATENT DOCUMENTS 288823 11/1988 European Pat. Off. .
235313 10/1987 Japan .

OTHER PUBLICATIONS

Research Disclosure, 14428 "Improved Elastomeric Yarn", Apr. 10, 1976.

Primary Examiner—Veronica P. Hoke

[57] ABSTRACT

Oligormeric polyether/urethanes with semicarbazide end-groups protect spandex fibers from discoloration in atmospheric fumes and/or light. The oligomers are prepared from polyether glycols, diisocyanates and N,N-dialkylhydrazine.

10 Claims, No Drawings

OLIGOMERIC SEMICARBAZIDE ADDITIVES FOR SPANDEX

BACKGROUND OF THE INVENTION

1. Field of the Invention

This invention relates to an additive for protecting polyurethane polymer from discoloration by atmospheric fumes and/or light. More particularly, the invention concerns such a stabilizer which is a polyether-/urethane oligomer having semicarbazide end-groups.

2. Description of the Prior Art

Polyether-based polyurethanes, especially those intended for use in spandex fibers, require protection against discoloration caused by oxidation, atmospheric fumes, nitrogen oxide gases, and the like. The art discloses stabilization of elastomeric polyurethanes with N,N-dialkylsemicarbazides, among many others. However, each of the forms and methods disclosed for incorporating N,N-dialkylsemicarbazides into the polyurethanes have shortcomings.

For example, Rosendahl et al, U.S. Pat. No. 3,658,746, discloses stabilizing polyurethane against discoloration and oxidation by incorporating, as additives in the polymer, low-molecular weight dialkylsemicarbazides and/or dialkylcarbazinic acid esters. However, these additives are readily extracted from such polymer, if the polymer is converted into fibers that are subjected to fabric dyeing and finishing treatments, thereby leaving the dyed and finished fibers unprotected.

Nakahara et al, U.S. Pat. No. 3,726,836, discloses protecting polyurethane solutions from aging under heating, by forming the polyurethane polymer with semicarbazide end-groups. The end-groups are formed by reacting isocyanate-terminated prepolymer with N,N-dialkylhydrazine and/or N,N-diarylhydrazine chain terminators. Such chain terminators are also disclosed in Research Disclosure, 14428, "Improved elastomeric yarn", Apr. 10, 1976. However, such methods for providing semicarbazide end-groups often are inadequate. The total number of semicarbazide end-groups that can be incorporated into the polymer is limited by the need for polymer of sufficiently high molecular weight to provide the polymer with adequate elastic properties.

Saitoh et al, U.S. Pat. No. 4,499,221, discloses, for use in spandex polymer, an additive in the form of the reaction product of a tertiary nitrogen atom-containing diol, an excess of an organic diisocyanate and a monoamine and/or a dialkylhydrazine chain-terminator. The reaction product includes an oligomeric semicarbazide and a wide distribution of molecular species, the lower members of which, such as bis-semicarbazides derived from the diisocyanate and two moles of dialkylhydrazine, are extractable, if the polymer is subjected to an aqueous scouring treatment. Such treatments, which are commonly employed for fabrics containing spandex fibers, remove the lower molecular weight species, and thereby reduce the stabilization provided by the semicarbazides.

Fujimoto et al, U.S. Pat. No. 4,666,966, discloses complex additives for protecting polyurethane elastic fiber from discoloration. The stabilizers are prepared from glycidyl derivatives of diamines, dialkylamines, isophorone diisocyanate and N,N-dialkylhydrazine. However, the present inventor found that the stabilizers are extracted by perchloroethylene dry-cleaning solvent.

A purpose of the present invention is to provide an additive which has a sufficient concentration of N,N-dialkylsemicarbazide groups to effectively protect polyurethane polymer, especially polyether-based spandex, against discoloration by atmospheric fumes and which overcomes the extractability problems associated with the above-described known semicarbazide additives.

SUMMARY OF THE INVENTION

The present invention provides an additive that is particularly suited for protecting polyether-based polyurethanes against discoloration. The additive is a polyether/polyurethane oligomer which has N,N-dialkylsemicarbazide end-groups and a number average molecular weight in the range of 1,000 to 5,000, preferably 2,000 to 3,000. Preferably, less than 15 mole percent of the total amount of semicarbazide groups in the additive is in the form of a simple diisocyanate-derived bis-semicarbazide. Most preferably, the additive is substantially free of monomeric bis-semicarbazide.

In preferred embodiments of the additive, the polyether portion of the additive is derived from tetrahydrofuran polymer or copolymer, the urethane portion is derived from an organic diisocyanate which is bis(p-isocyanatophenyl)methane, tolylene diisocyanate or bis(p-isocyanatocyclohexyl)methane, and the N,N-dialkylsemicarbazide end groups are derived from unsymmetrical 1,1-dimethylhydrazine.

The present invention also includes polyether-based spandex fibers containing an effective amount of the oligomeric N,N-dialkylsemicarbazide additive. Usually the effective amount is in the range of 5 to 60 milliequivalents of semicarbazide groups per kilogram of fiber, preferably 15 to 35 meq/kg.

The process for making the additive is an improvement over a known process in which (a) a polymeric glycol is reacted with an excess of an organic diisocyanate to form an isocyanate-terminated prepolymer (also referred to as a "capped glycol") containing unreacted diisocyanate, and then (b) the capped glycol is reacted with an N,N-dialkylsemicarbazide. The improvement of the present invention comprises removing, for example by distillation or extraction, the lower molecular weight products after formation of the capped glycol and/or after the reaction of the capped glycol with the semicarbazide.

DETAILED DESCRIPTION OF PREFERRED EMBODIMENTS

As used herein, the term "spandex" has its usual definition; that is, a long chain synthetic polymer that comprises at least 85% by weight segmented polyurethane. The terms "soft segment" and "hard segment" refer to specific portions of the spandex chain. In the present invention, the soft segments are the portions of the spandex chain that are derived from poly(tetramethyleneether)glycol (referred to as "PO4G") or tetrahydrofuran ("THF") copolymers, and the hard segments are the portions of the polymer chain that are derived from the reaction of isocyanates and a diamine chain extender. The isocyanate end group content of a prepolymer (i.e., an isocyanate-terminated PO4G intermediate) may be referred to as the NCO content. "Molecular weight" means number average molecular weight. "Fiber" includes in its meaning staple fibers and continuous filaments.

For convenience, in the discussion and examples which are presented hereinafter, the following trade names and abbreviations are used for the accompanying listed chemical:

| PO4G | poly(tetramethyleneether) glycol. |
|---|---|
| THF | tetrahydrofuran. |
| MeTHF | 3-methyltetrahydrofuran. |
| MDI | methylene-bis(4-phenylisocyanate), also named bis(p-isocyanatophenyl)-methane or p,p'-methylene diphenyl diisocyanate. |
| PICM | 4,4'-methylene-bis(cyclohexyl-isocyanate), also named bis(4-isocyanato-cyclohexyl)methane. |
| TDI | tolylene diisocyanate. |
| UDMH | 1,1-dimethylhydrazine, also named unsymmetrical dimethylhydrazine. |
| DMAc | N,N-dimethylacetamide solvent. |
| DIPAM/DM | A copolymer of diisopropylaminoethyl methacrylate and n-decyl methacrylate in a 75:25 weight ratio. |
| "Cyanox-1790" | 1,3,5-tris(4-t-butyl-3-hydroxy-2,6-dimethylbenzyl)-1,3,5-triazine-2,4,6 (1H,3H,5H)trione, an antioxidant, sold by American Cyanamid. |
| TiO$_2$ | rutile titanium dioxide pigment. |
| UMB | ultramarine blue pigment, sold by Reckitts, Ltd., North Humberside, England. |

According to the present invention, the oligomeric N,N-dialkylsemicarbazide additives are polyether/urethanes of low molecular weight. The alkyl groups of the dialkylsemicarbazide are preferably methyl or ethyl groups or the carbon-to-carbon segments of a piperidine ring. N,N-dimethylsemicarbazide groups are most preferred.

The oligomeric semicarbazides of the invention resemble polyether-based spandex polymers with semicarbazide end-groups, except for the much lower molecular weight of the oligomeric additive and the absence of urea groups from the additive, which groups are present in the spandex. Accordingly, the oligomers are compatible with such spandex polymers. For maximum compatibility, it is convenient to derive the polyether portion of the oligomer from the same polyether diol or polyol that is used to make the polyurethane polymer that the oligomeric additive is intended to protect. Thus, for protecting polyether-based spandex derived from tetrahydrofuran polymers or copolymers, an organic diisocyanate and diamine chain extenders, the polyether portion of the oligomeric additive is preferably derived from diols of the same tetrahydrofuran polymer or copolymer as the spandex. Typical comonomers of tetrahydrofuran that are used in spandex and in the oligomeric semicarbazide additives of the invention include 3-methyltetrahydrofuran, ethylene oxide, propylene oxide and the like.

Usually, the oligomeric N,N-dialkylsemicarbazide additive of the invention has a has a number average molecular weight in the range of about 1,000 to 5,000, preferably 2,000 to 3,000. Oligomeric N,N-dialkylsemicarbazide additives having a molecular weight of less than 500 usually are too readily extractable in conventional textile finishing and dry-cleaning operations. In oligomeric N,N-dialkylsemicarbazide additives of greater than 5,000 molecular weight, the fraction of the additive that is the semicarbazide group is very small, which results in a requirement for high concentrations of the additive to provide the desired stabilizing effect in the polyurethane polymer. Such high concentrations of additive can adversely affect the elastomeric properties of the polyurethane polymer.

To function effectively as a stabilizer in polyurethane elastomers, the oligomeric semicarbazide additives usually are employed at concentrations which result in 5 to 60 milliequivalents of semicarbazide groups per kg polymer. For spandex fibers, the preferred range is 15 to 35 meq/kg. For greater effectiveness in protecting polyether-based spandex fibers from discoloration that is caused by exposure to atmospheric fumes and light, the oligomeric semicarbazides additives of this invention are used in a synergistic combination with an effective amount a hydroxyphenyl-1,3,5-triazine light absorber. The light absorber usually amounts to 0.2 to 2 weight percent of the polymer. A preferred light absorber of this type is "Cyasorb-1164" which is a 2,4-di(2,,4'-dimethylphenyl)-6-(2"-hydroxy-4"-n-octyloxyphenyl)-1,3,5-triazine, sold by American Cyanamid. Also oligomeric N,N-dialkylsemicarbazides of the invention are preferably used in further combination with primary phenolic antioxidants such as "Cyanox 1790".

The dialkylsemicarbazide additives of the invention can be incorporated into polyurethane polymers or into spandex fibers by conventional techniques, much in the same way as other stabilizers are incorporated. For solution-spun spandex, the additive is mixed with spinning solvent, other additives and optionally polymer solution, to form a concentrated solution or slurry which is then mixed with polymer solution for spinning. Because the N,N-dialklysemicarbazide oligomers of the invention are generally soluble in conventionally used spandex spinning solvents, such as dimethylformamide and dimethlyacetamide, the incorporation of the semicarbazide additives into spinning solutions is readily accomplished without the formation of undesirable particles which can plug spinnerets.

The process for preparing the oligomeric semicarbazide additive of the invention is similar to the first two steps of the known process of preparing polyether-based polyurethane elastomers. In the known process, a polymeric polyether-based glycol is reacted with an excess of an organic diisocyanate to form an isocyanate-terminated polymer (also referred to as a "capped glycol") and then the capped glycol is reacted with a diamine chain extender. After forming the capped glycol, part of the excess diisocyanate remains unreacted. When, as in the present invention, the capped glycol is reacted with a dialkylhydrazine, the presence of still unreacted diisocyanate leads to the formation of undesired monomeric bis-semicarbazide. A key step in the process of the present invention comprises removing the lower molecular weight products, accomplished by conventional methods, as for example, by distillation or extraction. The removal of the undesired lower molecular weight products can be performed immediately after the step of forming the capped glycol and/or after reacting the capped glycol with the semicarbazide. As a result of the removal step, less than 15 mol percent of all the semicarbazide end groups in the additive are contributed by monomeric bis-semicarbazide. In this manner, the additive is made to contain less than about 2 percent by weight of monomeric bis-semicarbazide (depending on the molecular weight of the additive). Thus, the additive of the oligomeric semicarbazide of the invention can be made substantially free of monomeric bis-semicarbazide.

Any organic diisocyanate can be used for preparing the oligomeric semicarbazides additives, such as bis(p-isocyanatophenyl)methane (MDI), tolylene diisocyanate (TDI), bis(4-isocyanatocyclohexyl)methane (PICM), hexamethylene diisocyanate, 3,3,5-trimethyl-5-methylenecyclohexyl diisocyanate, and the like. MDI, TDI and PICM are preferred.

The effectiveness of additives of the invention in protecting polyurethane polymer from discoloration often depends on compatibility of the additive with the particular polyurethane polymer being protected. The oligomeric semicarbazide additive has the highest compatibility with polyurethane polymers made with the same diisocyanate. On the other hand, effectiveness of color stabilizers often depends on whether the stabilizer itself discolors on exposure, for example, to nitrogen oxides. In this respect, oligomeric additives of the invention made with non-aromatic diisocyanates are believed to discolor less than those made with aromatic diisocyanates. Thus, the effectiveness of an oligomeric semicarbazide additive for a spandex fiber is affected by the diisocyanate chosen for preparation of the additive, by the composition of the spandex polymer to be protected, and by the type of exposure against which the spandex fiber needs protection.

Selection of a diisocyanate for preparing an oligomeric semicarbazide additive according to the invention also depends on whether the physical and/or chemical properties of the diisocyanate are favorable for removal of free diisocyanate after the reaction of the polyether diol with excess diisocyanate has been completed. For example, if the diisocyanate has a relatively low boiling point, removal of excess diisocyanate by distillation would be facilitated. Also, if the isocyanate groups of a diisocyanate have different reactivities, removal of free diisocyanate from the prepolymer would be favored. The unequal reactivity of the isocyanate groups favors end-capping over chain-extension. As a result, the amount of free diisocyanate and the viscosity of the prepolymer are each decreased, thereby facilitating removal of diisocyanate by extraction or distillation.

The reaction between polyether diols and excess diisocyanate is well known in the art of polyurethane elastomer technology. The reaction is usually performed without solvent by mixing and heating the reactants for a few hours at a temperature in the range of 50 to 120° C until substantially all of the hydroxyl groups of the diol have been converted to isocyanate groups (i.e., the reaction is substantially complete). Progress of the reaction can be followed by determining the isocyanate content of samples. With slow reacting diisocyanates, catalysts such as dibutyltin dilaurate can be used. When the isocyanate groups of the diisocyanate have equal reactivity, the composition of the prepolymer mixture can be predicted by means of Flory's equations [P. J. Flory, J. Am. Chem. Soc. 58, 1877–85 (1936)]. The reactivities of the isocyanate groups of bis(4-isocyanatocyclohexyl)methane ["PICM"]are equal. Thus, reacting 1.67 moles of poly(tetramethyleneether) glycol ["PO4G"]of 1000 number average molecular weight with 4.17 moles of PICM yields 1 mole of isocyanate-terminated polymer of 2366 molecular weight, with 1.5 moles of free diisocyanate remaining unreacted. In contrast, the isocyanate groups of tolylene diisocyanate ["TDI"]are of unequal reactivity and cause formation of a less viscous lower-molecular weight prepolymer containing a smaller mole fraction of unreacted diisocyanate, when the TDI and PO4G are reacted under the same conditions as PICM and PO4G.

Several methods are available to remove excess diisocyanate from the mixture of isocyanate-terminated polyether glycol and isocyanate polymer mixtures. Removal of excess diisocyanate before the reaction of the isocyanate-capped glycol with a N,N-dialkylhydrazine in the next step of the process has been found to be an effective way of preventing the subsequent formation of monomeric bis(semicarbazide). McElroy, U.S. Pat. No. 2,969,386, discloses removal of the excess diisocyanate from such mixtures by extraction with hydrocarbon solvents. As shown in the examples below, the n-hexane is a particularly useful solvent in that it is not very soluble in the capped glycol and is easily adapted for continuous liquid/liquid extraction.

Other methods for excess diisocyanate removal include those disclosed by European Patent Application No. 288,823 which describes removing TDI from a capped polyether glycol and by Japanese Patent Application Publication No. 62-235,313 which describes the removal of hexamethylene diisocyanate from capped polyester-based prepolymer by stripping in a thin-film evaporator operating at a pressure in the range of 0.3 to 0.6 torr and a temperature of 160° C. This method again works best with a diisocyanate of relatively high volatility and a capped glycol of relatively low viscosity. Although these methods have been used for the preparation of polyurethanes, the methods have not previously been employed for the preparation of oligomeric additives.

The reaction of the capped glycol with a N,N-dialkylhydrazine to produce an oligomeric semicarbazide additive in accordance with the invention proceeds rapidly at room temperature. Unsymmetrical dimethylhydrazine is a preferred N,N-dialkylhydrazine for use in the present invention. Usually, the reaction is performed in an inert solvent, such as perchloroethylene. Often it is advantageous to carry out the reaction in the same solvent as is used for spinning the spandex polymer that is to be stabilized (e.g., N,N-dimethylacetamide). A stoichiometric quantity of dialkylhydrazine is used for reaction with the capped glycol. This avoids an excess of isocyanate or of dialkylhydrazine in the oligomeric semicarbazide product. Isocyanate could contribute to discoloration. The absence of excess dialkylhydrazine avoids the later possibility of extraction and release of potentially hazardous material from spandex fibers protected with the oligomeric additive during fiber manufacture or during subsequent textile finishing operations.

In an alternative process for preparing the oligomeric semicarbazide additives, the capped glycol containing free diisocyanate is converted into semicarbazide by reacting all of the isocyanate groups with N,N-dialkylhydrazine and then extracting the bis-semicarbazide formed by the reaction with the free diisocyanate. In this embodiment of the process, dilution of the prepolymer with an inert halogenated solvent, such as perchloroethylene, is particularly useful. The perchloroethylene increases the specific gravity of the solution and facilitates separation of the additive from undesired lower molecular weight species which subsequently are extracted with aqueous solvents. A mixture of methanol and water is particularly useful for extracting bis-semicarbazide derived from reaction of the dialkylsemicarbazide with the free diisocyanate. The oligomeric semicarbazide additive can then be isolated by evaporating the solvents from the remaining liquid. Then, the additive optionally may be redissolved in a spinning solvent for use as a spandex fiber stabilizer.

In the Examples which follow, several test procedures are used for demonstrating the effectiveness of oligomeric semicarbazide additives of the invention in protecting polyurethane polymers and polyether-based spandex fibers in particular, against discoloration and degradation.

Discoloration of test samples is determined as a change in "b" value (i.e., "Δb"), which is measured by means of a differential colorimeter (e.g., a model D-25-3 Differential Colorimeter manufactured by Hunter Associates Laboratory, Inc., of Reston, Virginia) which has been calibrated against the manufacturer's standard reference plates. For these measurements, yarn test samples are wound under low tension on an aluminum plate that measures 7.6 by 10.7 by 0.16 centimeters, to form a layer of about 3-millimeter thickness.

Prior to any exposure test reported herein, the yarns are given a simulated finishing treatment by immersing the yarns on the cards for 90 seconds in perchloroethylene at 45° C., followed by air drying and a simulated dyeing treatment in 90° C. water at pH 5 for 30 minutes and finally air-drying. The purpose of the simulated finishing treatment is to determine whether the oligomeric semicarbazide additives survive extraction by perchloroethylene, a solvent used in conventional textile solvent-scouring treatments.

Various exposure tests are reported in the examples. Exposure-to-combustion-fumes tests are conducted in accordance with Test Method 23-1962 of AATCC (American Association of Textile Chemists and Colorists). An atmospheric fume chamber Model 6528 made by United States Testing Company, Inc. of Hoboken, New Jersey, is employed. For exposures to nitrogen oxide with or without ultraviolet light, a Scott Controlled Atmosphere tester is used, into which air containing 1,000 ppm (parts per million) of nitrogen dioxide is introduced at a rate of 3 liters per minute. Light is supplied to the tester by eight "daylight" and four "black" fluorescent tubes (e.g., type F30T8 and FT038BL manufactured by General Electric Co.). A fan mixes and circulates the gases in the test chamber. For exposure to UV light, tests are conducted in the presence of water, in an Atlas Series C "Weather-ometer", made by Atlas Electric Devices Co. of Chicago, Illinois. In the Weather-ometer, samples are exposed to a xenon light having a spectrum resembling that of sunlight.

Thermal degradation tests on yarn samples are performed in an oven preheated to 175° C. The yarns are exposed for 30 or 60 minutes to air at 175° C.

Degradation in UV light is also determined by measuring the "growth" experienced by spandex fiber samples that are exposed to UV light while being held in a stretched condition. The growth, or increase in length after release from the stretch, is a result of plastic flow which occurs more rapidly when the polymer degrades during the light exposure. In this test, a 10-cm length of the fibers is mounted with 50% elongation (i.e., stretched to 15-cm length) on open frames and then exposed to UV light in a "Weather-ometer". After the exposure, the stretch is released, the fibers are allowed to relax for 15 minutes, and the increase in fiber length (i.e., over the original 10-cm length) is measured. The growth is reported as a percent of the applied stretch.

Extractability of additives by perchloroethylene is also measured, separately from the loss in fiber protection after perchloroethylene treatment of the yarn, by the following test. A 10-gram sample of yarn is cut into short pieces and then immersed and stirred for two minutes in 100 ml of perchloroethylene maintained at 45° C. The fibers are then filtered from the liquid. The perchloroethylene filtrate is evaporated in vacuo to leave a first residue which includes any additives or finishes that were removed from the yarn sample by the perchloroethylene. To facilitate analysis of the single components of the residue, the residue is separated into two fractions by extraction with hexane; one fraction contains materials insoluble in hexane and the other fraction contains the soluble materials. Most of the oligomeric semicarbazide additives are in the hexane-insoluble fraction. Both fractions are analyzed by evaporating the hexane, dissolving the residue in deuterated chloroform and then measuring the amount of oligomeric semicarbazide by NMR (nuclear magnetic resonance) analysis. Based on this determination, the percent of semicarbazide extracted from the fiber is calculated.

The concentration of semicarbazide groups is recorded in the examples in milliequivalents per kilogram of spandex fiber. The concentration is calculated from the amount of dialkylhydrazine that is added during preparation of the spandex polymer or additive.

The invention is further illustrated by the following examples of preferred embodiments. These examples are included for the purposes of illustration and are not intended to limit the scope of the invention, which scope is defined by the appended claims. The results reported in these examples are believed to be representative, but do not constitute all the runs involving the indicated ingredients. Unless otherwise specified, all percentages are by total weight of the fibers (without finish). Note that samples labeled with an Arabic numeral correspond to the example number and are of the invention. Samples labeled with upper case letters (e.g., A, B, C) are comparison samples and are outside the scope of the invention.

Examples 1, 2 and 3 illustrate the preparation of preferred oligomeric semicarbazide additives of the invention using different ingredients and preparative methods. Examples 4–12 illustrate use of the additives in spandex fibers.

EXAMPLE 1

This example illustrates the preparation of an oligomeric semicarbazide additive from poly(tetramethyleneether)glycol [PO4G] of 1,000 number average molecular weight, bis(4-isocyanato-cyclohexyl)methane [PICM] and 1,1-dimethylhydrazine [UDMH], in which a hexane extraction step is employed.

One third of a mole of PO4G of 1,000 molecular weight (Terathane®1000 made by E. I. Du Pont de Nemours and Co.) and 10 ml cyclohexane were stirred under an argon gas blanket for 30 minutes at 85° C. to remove moisture. After cooling to 55° C., 219 grams of PICM (Desmodur®W made by Mobay Co.) and 20 microliters of dibutyltin dilaurate catalyst were stirred into the mixture and the mixture was gradually heated to and held for an hour at 75° C. A sample of the thusly prepared capped glycol had an 7.65% NCO content. Then, 552 grams of the capped glycol mixture was stirred with 400 ml of hexane, which saturated the capped glycol. The mixture was transferred to a 2-liter continuous liquid/liquid extractor equipped with a magnetic stirrer bar, a flask for boiling solvent, a reflux condenser and funnel tube with fritted glass filter. Condensed solvent released at the bottom of the stirred capped glycol layer, rose to the solvent layer, from which it overflowed back into the boiling liquid in the flask. The condenser opening was protected against the entry of moisture by a tube filled with "drierite". Continuous extraction for 86 hours removed 56% of the NCO from the capped glycol. Theoretically, the free diisocyanate in the capped glycol originally accounted for 60% of the isocyanate. The bottom layer after solvent removal analysed 3.63% isocyanate versus 3.55% theoretically, if all free diisocyanate had been removed. The extracted prepolymer (412.7 grams) was dissolved in a solution of 21.42 grams of UDMH in 422 grams N,N-dimethylacetamide [DMAc], which caused a moderate evolution of heat of reaction. The resulting solution was free of NCO and contained 0.414 milliequivalents of semicarbazide per gram of solution in the form of oligomeric semicarbazide.

EXAMPLE 2

This example illustrates the preparation of an oligomeric semicarbazide additive from poly(tetramethyleneether)glycol [PO4G] of 1,000 number average molecular weight, bis(p-isocyanatophenyl)methane [MDI] and 1,1-dimethylhydrazine [UDMH], in which an aqueous extraction step is employed.

One sixth of a mole of Terathane®1000 was dried as in Example 1 and reacted with 104.6 grams of MDI for 90 minutes at 85° C. without the addition of catalyst, to give a capped glycol having 7.98% NCO. A weight of 270.64 grams of the capped glycol was diluted with 300 grams of perchloroethylene and 30.05 grams of UDMH was added with stirring, causing a rise in temperature. After cooling, the thusly formed turbid solution was diluted with 200 ml of methanol, transferred to a separating funnel, and 100 ml of water were added. After thorough shaking, the layers were separated. After evaporation of the liquid in the top layer, a 7.85-gram solid residue was covered. The residue was the bis-semicarbazide derived from MDI and UDMH. Extraction with 200 ml of methanol and 100 ml of water was repeated five more times. A total of 43.85 grams of MDI bis-semicarbazide was recovered from top layers. The melting point of the residue after recrystallization from toluene was 168° C. This represented a recovery of 79% of the monomeric bis-semicarbazide theoretically present in the reaction product of the capped glycol and the UDMH. From the bottom layer, 244 grams of extracted oligomeric semicarbazide additive was recovered. The oligomeric semicarbazide additive was diluted with 245 grams of DMAc to provide a solution of oligomeric semicarbazide containing 0.504 milliequivalents of semicarbazide per gram of solution.

EXAMPLE 3

This example illustrates the preparation of an oligomeric semicarbazide additive from poly(tetramethyleneether)glycol [PO4G] of 1,800 number average molecular weight, tolylene diisocyanate [TDI] and 1,1-dimethylhydrazine [UDMH], in which a hexane extraction step is employed.

One tenth of a mole of PO4G of 1,800 molecular weight was dried by heating with 5 ml of cyclohexane for 30 minutes at 85° C. under argon and then reacted with 43.5 grams of technical tolylene diisocyanate (an 80/20 mixture of 2,4- and 2,6-isomers) by heating for 3 hours at 85° C. to yield capped glycol of 5.02% NCO. The capped glycol was extracted twice by shaking with 2 liters of hexane, allowed to settle and then the top layer was removed. Isocyanate analysis showed that the top layers contained an equivalent of 5.27 grams of tolylene diisocyanate. The bottom layer was diluted with 100 ml of perchloroethylene and transferred to a rotating evaporator flask to remove the solvent. After evaporation, 212 grams of extracted capped glycol of 3.35% NCO were recovered. The data indicated that not all isocyanate was accounted for and that some TDI may have been lost by evaporation. A 204.74-gram weight of the extracted capped glycol was reacted with 9.87 grams of UDMH in 214 grams of DMAc to give a solution containing 0.383 milliequivalents of oligomeric semicarbazide per gram of solution.

EXAMPLES 4-7

These examples demonstrate the advantageous use of the oligomeric semicarbazide additives of Examples 1 and 3 in polyether-based spandex fibers. The results of exposure testing of the spandex dull and clear fibers containing the additives are compared to results obtained with such fibers from which the additives were omitted.

The spandex yarns were prepared as follows. A solution of segmented polyether-based polyurethane/urea elastomer was prepared by the general procedure described in Hunt, U.S. Pat. No. 3,428,711. An intimate mixture of bis(p-isocyanatophenyl)methane ("MDI") and poly(tetramethyleneether)glycol ("PO4G") of 1800 number average molecular weight, in a molar ratio of 1.63, was maintained at a temperature in the range of 80 to 90° C for about 90 to 100 minutes, to yield an isocyanate-terminated polyether/urethane (i.e., a "capped glycol"). The latter, after having been cooled to 60° C., was mixed with N,N-dimethylacetamide ("DMAc") to provide a solution containing about 45% solids. Then, with vigorous mixing, the capped glycol was reacted for 2 to 3 minutes at a temperature of about 75° C. with a DMAc solution containing a mixture of diethylamine chain-terminator and a 90/10 molar ratio of ethylene diamine and 1,3-cyclohexylene diamine chain-extenders. The resulting solution of segmented polyurethane/urea contained approximately 37% solids and had a viscosity of about 2,500 poises at 40° C.

For the spinning of clear spandex yarns, the following ingredients were added to the polymer solution to provide the listed percentages of additive (based on the final weight of spandex fiber without finish).

(a) 1.5 % of "Cyanox" 1790 antioxidant
(b) 2.0 % of DIPAM/DM dye enhancer
(c) 0.6 % of a silicone oil and
(d) 20 milliequivalents of oligomeric semicarbazide.

Solutions for spinning dull yarns were prepared as in the preceding two paragraphs, with the same additives, but with the following additional pigments:

(e) 4.1% rutile Ti02
(f) 1.3% zinc oxide
(g) 0.01% ultramarine blue

The solutions were dry-spun in a conventional manner through orifices to form coalesced 8-filament, 78-dtex yarns. Clear spandex yarns containing 20 meq/kg of the oligomeric semicarbazide additive of Example 1 were designated samples for Example 4; those containing 20 meq/kg of the additive of Example 3 were designated samples for Example 5. Similarly, dull spandex yarn samples of Example 6 contained 20 meq/kg of the semicarbazide additive of Example 1 and sample yarns of Example 7 contained 20 meq/kg of the semicarbazide of Example 3. Comparison samples, from which oligomeric semicarbazide additive was omitted, were spun from clear solution to form Sample A and from dull solution to form Sample B.

Samples of the dry-spun yarns were given a simulated solvent finishing treatment before being subjected to exposure testing. The simulated finishing treatment consisted of a 90-second immersion of the yarn in perchloroethylene maintained at 45° C, followed by an aqueous boil-off. The yarns were then exposed for 40 hours to nitrogen oxides ($NO_2$), for 40 hours to $NO_2$ and ultraviolet light ($NO_2$ +UV), 40 hours to UV light, and in one hour to air at 175° C. in accordance with the test procedures described hereinbefore. The discoloration undergone by the samples in these tests was measured as a change in b-color value and is reported in "Δb" units in the following tables (Table 1 for clear yarns and Table 2 for dull yarns).

TABLE 1

| Sample | Clear Spandex Yarn | | |
|---|---|---|---|
| | Example 4 | Example 5 | Comparison A |
| Semicarbazide of | Example 1 | Example 3 | — |
| meq/kg | 20 | 20 | None |
| Exposure Tests | | | |
| Δb Discoloration | | | |
| $NO_2$ | 5.3 | 5.7 | 8.8 |
| $NO_2$ + UV | 5.5 | 7.0 | 10.8 |
| UV | 8.6 | 10.3 | 12.1 |
| 175° C. air | 5.0 | 3.6 | 10.9 |

TABLE 2

| Sample | Dull Spandex Yarn | | |
|---|---|---|---|
| | Example 6 | Example 7 | Comparison B |
| Semicarbazide of | Example 1 | Example 2 | — |
| meq/kg | 20 | 20 | None |
| Exposure Tests | | | |
| Δb Discoloration | | | |
| $NO_2$ | 2.7 | 3.1 | 4.2 |
| $NO_2$ + UV | 2.1 | 2.8 | 4.3 |
| UV | 2.4 | 3.7 | 4.1 |
| 175° C. AIR | 2.5 | 2.8 | 4.5 |

The test results summarized in Tables 1 and 2 show that the oligomeric semicarbazide additives of Examples 1 and 3, at addition concentrations of 20 milliequivalents of semicarbazide per kg of fiber, are highly effective in reducing discoloration in both clear and dull spandex fibers in a variety of exposures, even if the fibers were exposed to extraction with perchloroethylene solvent before being exposed.

EXAMPLES 8-12

The effectiveness of oligomeric semicarbazides additives of the invention in protecting spandex fibers from discoloration on exposure to various atmospheres, heat and ultraviolet light, is further demonstrated in these examples with the additives of Examples 1 and 2. The relatively low extractability of these additives by dry-cleaning solvent is also illustrated.

Dull, polyether-based spandex polymer solutions were prepared as described above in Examples 4-7, except for the particular semicarbazide added to the solution. The solutions were then dry spun into 4-filament, 44-dtex yarns. For Examples 8 and 9, 15 and 25 meq/kg of the oligomeric semicarbazide additive of Example 1 were added to the spandex yarns respectively. For Example 10, 17 meq/kg of the oligomeric semicarbazide additive of Example 2 was included in the spandex yarn. A comparison yarn, Comparison C was prepared in the same way except that the semicarbazide additive was omitted. The yarns were wound on cards, extracted with perchloroethylene as the preceding Examples and then exposed for 40 hours to various atmospheres and ultraviolet light and for 1 hour to air at 175° C. Discoloration was measured in "delta b" units. In addition, yarns were mounted with a 50% stretch on frames and exposed in a Weather-ometer for 40 hours, after which the percent UV growth was measure. The results of the exposure tests are summarized in Table 3.

TABLE 3

| Sample | Dull Spandex Yarn | | | |
|---|---|---|---|---|
| | Ex. 8 | Ex. 9 | Ex. 10 | Comparison C |
| Semicarbazide of | Ex. 1 | Ex. 1 | Ex. 2 | — |
| meq/kg | 15 | 25 | 17 | None |
| Exposure Tests | | | | |
| Δb Discoloration | | | | |
| Fumes | 5.0 | 4.6 | 4.8 | 5.6 |
| $NO_2$ | 8.0 | 5.8 | 9.0 | 9.6 |
| $NO_2$ + UV | 4.9 | 3.6 | 5.2 | 7.2 |
| UV | 3.5 | 3.0 | 4.1 | 4.5 |
| 175° C. air | 2.8 | 2.6 | 2.9 | 5.8 |
| % UV Growth | 31 | 36 | 33 | 49 |

As shown by the data in Table 3, the yarns containing the oligomeric semicarbazide additives experienced less discoloration in the exposure tests, as well as less UV-induced growth, versus Comparison C, the same yarn without semicarbazide additive. Also, results of Examples 8 and 9 show the increasing advantage with increasing concentration of the oligomeric semicarbazide additive. These advantages were evident even though the yarns were scoured with perchloroethylene prior to the exposure tests.

To further demonstrate the relatively low extractability of the oligomeric semicarbazide additives by dry cleaning solvent, additional dull spandex yarns were spun, cut into short lengths, extracted with perchloroethylene and filtered. The filtrate was analysed to measure the percent of the semicarbazide additive that was extracted. The percent of antioxidant ("Cyanox" 1790) that was extracted was also measured. The fibers of Examples 11 and 12 each originally contained 1.5% of "Cyanox-1790" by total weight of the fiber and 2.3% of oligomeric semicarbazide additive. Yarns of Example 11 contained the semicarbazide additive of Example 1, and yarns of Example 12 contained the semicarbazide additive of Example 2. The extraction test results summarized in Table 4 show that the oligomeric semicarbazide additives were extracted only about one-third as much as was the "Cyanox-1790" antioxidant.

TABLE 4

| | Extraction Tests | |
|---|---|---|
| | Ex. 11 | Ex. 12 |
| Semicarbazide | | |
| Identity | Ex. 1 | Ex. 2 |
| Weight % Spun In | 2.3 | 2.2 |
| Percent Extracted | 29 | 26 |
| "Cyanox-1790" | | |
| Weight % Spun In | 1.5 | 1.5 |

TABLE 4-continued

| Extraction Tests | | |
|---|---|---|
| | Ex. 11 | Ex. 12 |
| Percent Extracted | 80 | 80 |

I claim:

1. A polyether/urethane oligomer additive, particularly suited for protecting polyether-based polyurethane polymer against discoloration, the additive having N,N-dialkylsemicarbazide end-groups and a number average molecular weight in the range of 1,000 to 5,000.

2. An additive in accordance with claim 1 wherein less than 15 mole percent of the total amount of semicarbazide groups in the additive is in the form of a diisocyanate bis-semicarbazide.

3. An additive in accordance with claim 2 wherein the molecular weight is in the range of 2,000 to 3,000 and the additive is substantially free of monomeric bis-semicarbazide.

4. An additive in accordance with claim 3 wherein the polyether portion of the additive is derived from tetrahydrofuran polymer or copolymer, the urethane portion is derived from bis(p-isocyanatophenyl)methane, bis(p-isocyanatocyclohexyl)methane or tolylene diisocyanate and the N,N-dialkylsemicarbazide end groups are derived from 1,1-dimethylhydrazine.

5. A method of protecting a polyether - based spandex fiber against discoloration caused by exposure to fumes and/or light comprising physically incorporating in the spandex, in an effective amount, an additive of any one of claims 1, 2, 3 and 4.

6. A method in accordance with claim 5 wherein the effective amount is in the range of 5 to 60 milliequivalents of semicarbazide groups per kilogram of fiber.

7. A method in accordance with claim 5 wherein the effective amount is in the range of 15 to 35 milliequivalents of semicarbazide groups per kilogram of fiber.

8. A process for making the additive of claim 1, comprising reacting polyether glycol with an excess of an organic diisocyanate to form an isocyanate-capped glycol containing free diisocyanate, then reacting the capped glycol with an N,N-dialkylsemicarbazide and removing the lower molecular weight products after formation of the capped glycol and/or after the reaction of the capped glycol with the semicarbazide.

9. A process in accordance with claim 8 wherein lower molecular weight products are removed from the isocyanate-capped glycol by distillation or extraction before reacting the capped glycol with N,N-dialkylhydrazine.

10. A process for preparing a stabilizer of claim 1 wherein a polyether diol is reacted successively with an excess of organic diisocyanate and a stoichiometric amount of dialkylhydrazine and monomeric bis-semicarbazide formed during the reaction of excess diisocyanate with the dialkylsemicarbazide is removed by extraction.

* * * * *